Feb. 15, 1944.   R. J. MILLER   2,341,734
MOTION PICTURE PROJECTOR
Filed March 15, 1941   3 Sheets-Sheet 1

INVENTOR.
RAYMOND J. MILLER
BY
*A. E. Wilson*
ATTORNEY

Feb. 15, 1944.   R. J. MILLER   2,341,734
MOTION PICTURE PROJECTOR
Filed March 15, 1941   3 Sheets-Sheet 2

INVENTOR.
RAYMOND J. MILLER
BY
A. E. Wilson.
ATTORNEY

Feb. 15, 1944.   R. J. MILLER   2,341,734
MOTION PICTURE PROJECTOR
Filed March 15, 1941   3 Sheets-Sheet 3
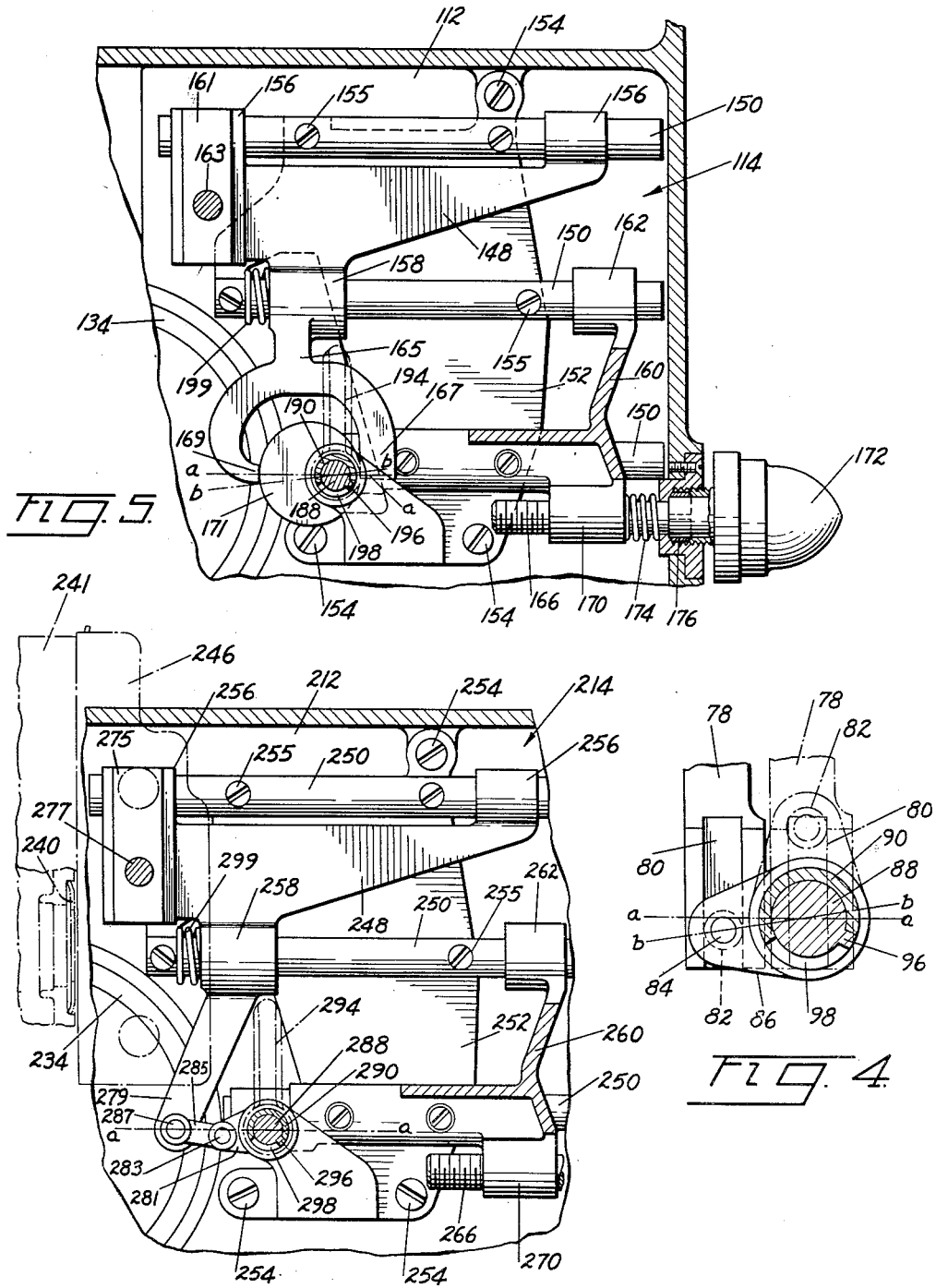
INVENTOR.
RAYMOND J. MILLER
BY
A. E. Wilson
ATTORNEY Patented Feb. 15, 1944

2,341,734

UNITED STATES PATENT OFFICE 2,341,734

MOTION PICTURE PROJECTOR

Raymond J. Miller, Detroit, Mich., assignor to American Pattern and Manufacturing Co., Detroit, Mich., a copartnership consisting of said Miller and Alfred E. Wilson, Detroit, Mich.

Application March 15, 1941, Serial No. 383,528

9 Claims. (Cl. 88—17)

This invention relates to motion picture projectors and more particularly to improved means for supporting and actuating the aperture pressure plate housing.

In the operation of motion picture projectors, independent visual images carried by a continuous strip of film of any suitable material are successively aligned with an aperture and are projected from the film onto a screen by a light directed through the aperture and film. Means such for example as an aperture pressure plate housing having a plurality of spaced shoes may be provided to yieldingly urge the film into engagement with spaced film tracks positioned adjacent the aperture.

It is necessary that the aperture plate housing be movable relative to the aperture pressure plate and film tracks to enable the operator to thread the film onto the film driving sprockets employed to drive the film and align successive film frames with the aperture. Heretofore the aperture pressure plate housing has been so mounted that it could be moved away from the aperture plate against the resistance of a relatively heavy spring employed to yieldingly urge the housing towards the plate. This mechanism has not been satisfactory because the mounting structure has been unstable and unless carefully manipulated the housing would slam against the film tracks and aperture plate injuring the film and subjecting the movable parts of the projector to undesirable shock.

An object of this invention is therefore to provide a rigid mounting for an aperture pressure plate housing whereby the housing may be moved relative to an aperture plate in an improved manner to enable the operator to "thread up" the projector.

A further object resides in the provision of an aperture pressure plate housing support member movably mounted on a plurality of spaced rods in such a manner that the housing is accurately maintained in alignment with the aperture plate.

Another object is to provide a horizontally and vertically adjustable support member for an aperture pressure plate housing.

Still another object is to provide a novel aperture pressure plate housing and support member therefor which may be readily removed from the film compartment of a projector, and which if desired may be insulated from the projector casing to minimize distortion due to variations of temperature.

Yet a still further object of the invention resides in the provision of improved actuating means for an aperture pressure plate housing whereby the housing may be smoothly and easily actuated and positively locked when in the closed position relative to the aperture plate of the projector.

Another object is to provide an improved and rugged supporting and actuating member for an aperture pressure plate housing which may be economically manufactured.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 4 is an enlarged view of the actuating mechanism of Fig. 3 showing the housing support member in two operative positions.

Fig. 5 is a sectional view similar to Fig. 3 showing a modified form of the invention.

Fig. 6 is also a sectional view similar to Fig. 3 showing a further modified form of the invention.

Figure 1:
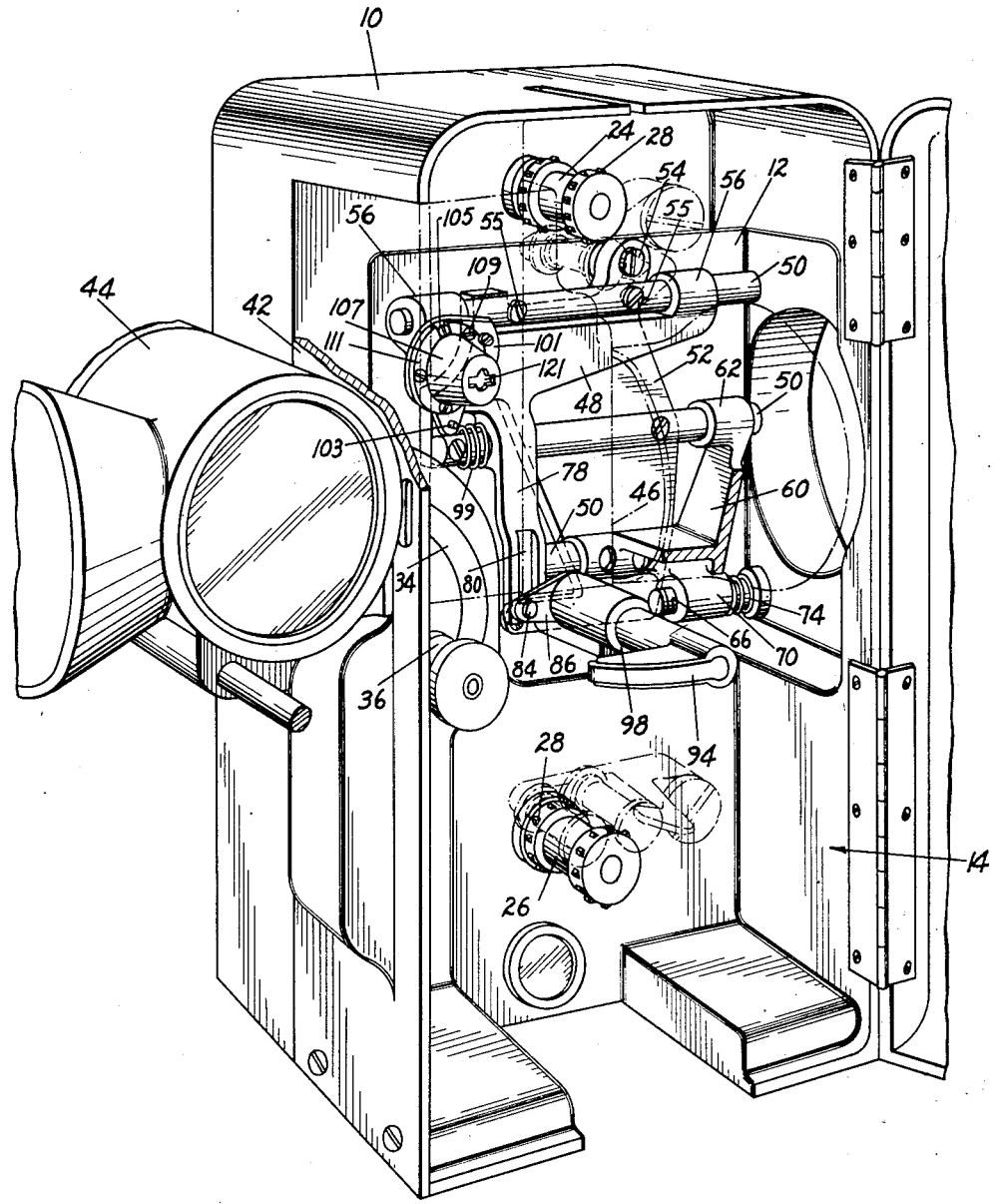
Fig. 1 is a perspective view of a motion picture projector embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Figs. 1 to 4, it will be observed that the invention is illustrated as being embodied in a motion picture projector having a main casing 10. A substantially vertically extending intermediate wall 12 divides the space within the casing 10 into a film compartment 14 and a mechanism compartment 16.

A substantially vertically extending drive shaft 18 positioned in the mechanism compartment 16 is operably connected through substantially horizontally extending shafts 20 and 22 projecting through the intermediate wall 12 to actuate film driving sprockets 24 and 26 having radially extending sprocket teeth 28 adapted to project through spaced apertures in the film to drive the film at a substantially predetermined speed.

The vertically extending drive shaft 18 is mounted in a gear train carrier column 30 and is operably connected through a shaft 32 and an intermittence driving mechanism 34 with an intermittently driven sprocket 36 positioned in the film compartment 14. The sprocket 36 is intermittently driven to momentarily align successive film frames with an aperture 38 formed in an aperture plate 40 carried by an aperture plate housing 41.

The aperture plate 40 is spaced from a back wall 42, and the aperture 38 is aligned with a light admitting aperture 43 and a shutter housing 44. The shutter housing 44 is preferably provided with a power driven shutter adapted to intermittently interrupt the flow of projecting light through the aperture and film as the intermittently driven sprocket 36 is actuated to align successive film frames with the aperture 38.

The film is maintained in alignment with the film tracks 45 associated with the aperture plate 40 by a plurality of spaced film engaging shoes 47 yieldingly urged into engagement with the film by film shoe springs 49 carried by a pressure spring carrier plate 51 of the pressure plate housing 46. The film is maintained in contact with the sprocket teeth 28 of the intermittently driven sprocket 36 by an intermittence sprocket shoe 53 carried by the pressure plate housing 46 and adjustably mounted relative to the intermittently driven sprocket 36.

Means are provided to permit movement of the pressure plate housing 46 away from the film tracks 45 and aperture plate 40 to permit the operator to thread the film between the aperture plate housing 41 and the pressure plate housing 46 and into engagement with the film driving sprockets.

One desirable form of such actuating means comprises a pressure plate housing carrier arm 48 slidably mounted on a plurality of vertically spaced generally horizontally extending rods 50. The rods 50 may be secured to a bracket 52 by means of a plurality of screws 55. The bracket 52 may be secured to a fixed portion of the projector such for example as to the intermediate wall 12 by a plurality of screws 54. If desired, suitable heat insulating material may be interposed between the rods 50 and the bracket 52 and between the bracket 52 and the fixed portion of the projector to retard the flow of heat.

The carrier arm 48 may be provided with suitable engaging means such for example as a plurality of spaced bosses 56 slidably mounted on the upper rod 50 and a single boss 58 slidably mounted on the intermediate rod 50. The carrier arm is thus supported at a plurality of spaced points, preferably three, whereby a rigid mounting for the pressure plate housing 46 is provided.

A lens carrier bracket 60 preferably mounted on the lower rod 50 at a plurality of spaced points and on the intermediate rod 50 by a single boss 62 may be provided to support a lens carrier tube 64 in alignment with the aperture 38 of the aperture plate 40. The lens carrier tube 64 is thus also mounted in the film compartment 14 at a plurality of spaced points whereby a relatively rigid supporting structure is provided. It will be noted that the intermediate rod 50 acts as a supporting member for both the aperture pressure plate carrier arm 48 and the lens carrier bracket 60. A strong and compact structure is thus provided.

A lens focusing and locking mechanism may be provided to move the lens carrier bracket 60 longitudinally on the rods 50 to focus the projected images on the screen. One desirable form of such focusing device comprises a stud 66 mounted in the front wall 68 of the casing 10 and threaded into a boss 70 carried by the lens carrier bracket 60. A manually operable control knob 72 may be provided to actuate the stud 66 to rotate it in the boss 70 to move the lens carrier bracket 60 on the rods 50.

A spring 74 may be interposed between the front wall 68 and the boss 70 to yieldingly urge cooperating male and female thread portions of the stud 66 and boss 70 into engagement thereby in effect giving a micrometer adjustment of the lens carrier tube 64. A locking mechanism 76 may be provided to lock the lens carrier bracket 60 in a substantially predetermined position in the film compartment 14.

Motion transmitting means may be provided between the pressure plate housing carrier arm 48 and a relatively fixed portion of the projector to move the pressure plate housing 46 away from the aperture plate housing 41 to enable the operator to thread the film into operative relation with the film guiding and driving elements of the projector.

One desirable form of such motion transmitting means comprises a downwardly extending projection 78 having a substantially vertically extending slot 80 formed therein. The slot 80 receives an actuating member such as a roller 82. The roller 82 is mounted on a pin 84 carried by an arm 86 fixed to a shaft 88. The shaft 88 is rotatably mounted in a boss 90 supported by an outwardly extending projection 92 of the bracket 52.

The shaft 88 is provided with an actuating lever 94 and a stop member 96 adapted to be rotatably mounted in a slot 98 formed in the outer edge of the boss 90 to limit rotational movement of the shaft 88 between substantially predetermined limits. Movement of the pressure plate housing 46 away from the aperture plate housing 41 is therefore limited to a desired distance.

It will be noted that the actuating member or roller 82 moves beyond the dead center position in the slot 80 to provide a positive lock to prevent the motion transmitting mechanism from being unintentionally actuated to permit the pressure plate housing 46 from moving away from the aperture plate housing 41 while the projector is operating.

Yielding means may be interposed between the film engaging shoes 47 carried by the pressure plate housing 46 and the actuating lever 94 to compensate variations of thickness of the film such for example as caused by the presence of a patch in the film. Such yielding means may take the form of the film shoe springs 49 carried by the pressure plate housing 46 or may take the form of a spring 99 positioned between the boss 58 of the carrier arm 48 and a relatively fixed portion of the projector such for example as a portion of the intermediate rod 50. Such yielding means cooperates with the locking means formed by the movement of the roller 82 beyond the dead center position in the slot 80 to prevent unintentional actuation of the motion transmitting means.

The operation of the pressure plate housing 46 is as follows: When the actuating lever 94 is turned in the clockwise direction, it causes the arm 86 to revolve likewise. The roller 82 on the pin 84 carried by the arm 86 moves upwardly in the slot 80 of the downwardly extending projection 78 of the carrier arm 48 and moves the carrier arm forwardly, thus opening the aperture plate housing 41 to give access for threading film into the machine.

When the film is placed in the machine, the actuating lever 94 is rotated in the counterclockwise direction, causing the roller 82 to move downwardly in the slot 80 to move the pressure plate housing 46 backwardly in the film compartment 14 and closing the aperture pressure plate. As the roller 82 passes the dead center position in the slot 80 as illustrated by the axis a—a of Fig. 4 and is moved to a substantially predetermined position such for example as illustrated by the axis b—b of Fig. 4 as permitted by the stop member 96 carried by the actuating shaft 88, the aperture pressure plate is locked in the closed position. The movement of the stop member 96 in the slot 98 controls the amount of actuation of the pressure plate housing 46 as above described.

The spring 99 exerts pressure on the actuating arm and the slot and this force is transmitted through the roller 82 to the stop member 96 carried by the shaft 88. The aperture pressure plate housing therefore cannot be forced open by a patch or other obstruction on the film as it passes through the machine, since the pin 84 and the roller 82 are maintained at a point in the slot 80 below dead center of the shaft 88.

The foregoing described construction is shown in larger scale in Fig. 4 in which the dotted line view shows the parts in the positions they occupy when the aperture carrier plate housing is open. The solid lines show the parts in the locked position. The position of the stop member 96 in the slot 98 is here clearly shown.

Means may be provided to mount the pressure plate housing 46 on the housing carrier arm 48 in such a manner that it may be adjusted vertically and horizontally to properly align it with the aperture plate housing 41.

Figure 2:
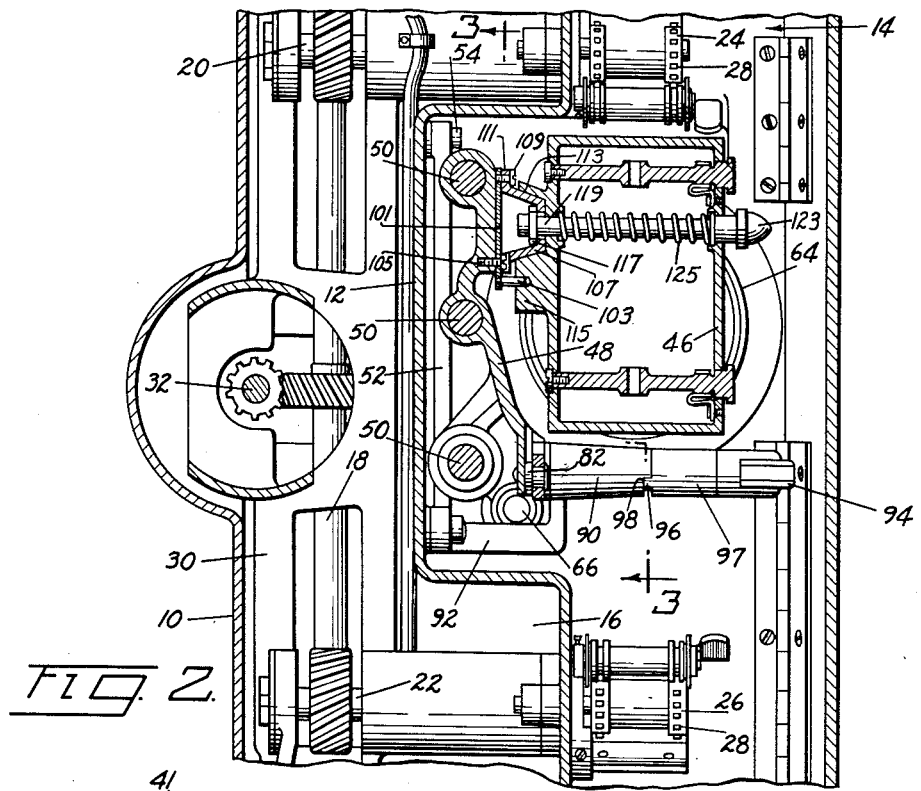
Fig. 2 is a sectional view of a portion of the device illustrated in Fig. 1.

One desirable form of such adjustable mounting means comprises an adjustable locking device more clearly shown in Fig. 2. The arrangement of the parts is such as to permit ready removal of the pressure plate housing 46 as a unit from the film compartment 14 of the projector.

The carrier arm 48 is provided with a plate 101 having a laterally extending pin 103 projecting therefrom. The plate 101 may be secured to the arm 48 by a plurality of screws 105 projecting through generally arcuate shaped slots in the plate 101 whereby the plate may be rotated slightly relative to the arm 48 to adjust the vertical position of the pressure plate housing 46 relative to the aperture plate housing 41, and to adjust the contact position of the intermittence sprocket shoe 53 relative to the intermittently driven sprocket 36.

A male cone 107 may be secured to the plate 101 by a plurality of screws 109 projecting through vertically extending slots in a flange 111 carried by the male cone 107 whereby the cone can be elevated or lowered slightly relative to the plate 101 to adjust the vertical position of the pressure plate housing 46 relative to the aperture plate housing 41.

The pressure plate housing 46 is provided with a laterally extending female cone 113 adapted to receive the male cone 107 and is also provided with an apertured boss 115 adapted to receive the pin 103.

The pressure plate housing 46 may be locked and unlocked in position on the male cone 107 by a locking key 117 carried by a locking shaft 119 and adapted to project inside the male cone 107 through a slot 121. The locking key 117 is actuated by the locking shaft 119 having an actuating knob 123 and is maintained in locking position by the tension of a spring 125.

Frequent removal of the pressure plate housing 46 is desirable in order to permit cleaning of the pressure plate housing and the film tracks and shoes. The removal of the aperture pressure plate housing as a unit is accomplished by turning the locking key 117 from the vertical position to the horizontal position so that it is aligned with the slot 121. In this position the locking key 117 can be withdrawn and the entire pressure plate housing 46 may then be removed from the male cone 107.

In replacing the aperture pressure plate housing the guide pin 103 carried by the adjustment plate 101 enters the aperture of the boss 115. The complete alignment is obtained by contact of the female cone 113 and the male cone 107. In assembling the mechanism the housing 46 is pressed firmly back until the female cone 113 contacts the male cone 107. The actuating knob 123 which actuates the locking key 117 is then pressed inwardly toward the male cone thereby compressing the spring 125 until the locking key 117 occupies a position inside the male cone 107. The knob 123 is then rotated 90° and the locking key 117 fits into shallow grooves on the inside of the male cone 107 as illustrated by the position occupied by the locking key 117 of Fig. 3. When the key is moved to the locked position the knob 123 is released whereupon the spring 125 resiliently holds the parts securely in the assembled position because the pressure plate housing 46 is firmly supported and aligned at vertically spaced points on the cooperating cones and by the pin and apertured boss.

The embodiment of the invention illustrated in Fig. 5 is similar in many respects to the embodiment illustrated in Figs. 1 to 4. Corresponding parts have therefore been given corresponding reference numerals with the addition of 100.

The pressure plate housing may if desired be attached to a carrier plate 161 fixed to the carrier arm 148 by means of a bolt 163.

The pressure plate housing carrier arm 148 may be provided with a downwardly extending actuating member 165 having a pair of spaced members 167 and 169 positioned to be engaged by a cam 171 carried by the shaft 188 to move the pressure plate housing carrier arm 148 towards the open and closed positions respectively with reference to the aperture plate housing.

It will be noted that actuating portion of the cam 171 engaging the member 169 is permitted to move beyond the dead center position illustrated by the axis a—a, to an angular position illustrated by the axis b—b, to permit the yielding means such as the film shoe engaging springs or the spring 199 to exert a force to yieldingly maintain the pressure plate housing in the closed position with reference to the aperture plate housing.

When it is desired to move the pressure plate housing from the closed position with reference to the aperture plate housing, the actuating lever 194 is rotated in the clockwise direction from the position illustrated. This rotational movement of the actuating lever is transmitted through the shaft 188 to move the cam 171 in the clockwise direction also. The initial movement of the cam 171 moves the actuating surface of the cam which engages the member 169 from the position on the axis b—b to a position on the axis a—a. The yielding means between the carrier arm 148 and the aperture plate housing is compressed as the cam moves beyond the dead center position on the axis a—a to render the yielding lock inoperative. Further rotational movement of the cam 171 in the clockwise direction exerts a force on the member 167 to move the pressure plate housing carrier arm 148 on the rods 150 to separate the pressure plate housing from the aperture plate housing to enable the operator to thread film into the projector. The stop member 196 moving in the slot 198 limits rotational movement of the shaft 188 and cam 171 and hence the movement of the carrier arm 148 on rods 150.

Figure 3:
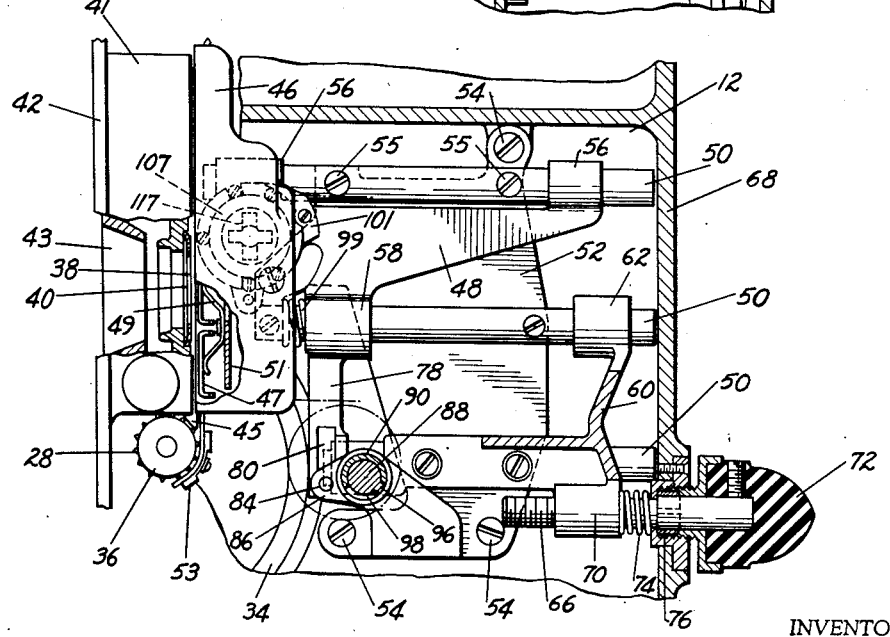
Fig. 3 is a sectional view taken substantially on the line 3—3 of Fig. 2, looking in the direction of the arrows.

The embodiment of the invention illustrated in Fig. 6 is also similar in many respects to the embodiment illustrated in Fig. 3. Corresponding parts have therefore been given corresponding reference numerals with the addition of 200.

In this embodiment of the invention the pressure plate housing 246 is illustrated as being detachably connected to the housing carrier arm 248 mounted on the rods 250 by means of a plate 275 and a bolt 277.

The housing carrier arm 250 is preferably provided with a downwardly and backwardly extending projection 279 which may be actuated to move the pressure plate housing carrier arm 248 on the rods 250 to open the space between the pressure plate housing 246 and the aperture plate housing 241 to thread film into the projector.

The shaft 288 rotatably mounted in the boss 290 carried by the bracket 252 is provided with an arm 281. The arm 281 is pivotally connected by a pin 283 with a link 285 pivotally connected by a pin 287 with the projection 279 of the carrier arm 248.

It will be noted that when the gate or pressure plate housing 246 is in the closed position relative to the aperture plate housing 241, the pin 283 interconnecting the arm 281 and the link 285 lies beyond the dead center position of the toggle connection defined by the axis a—a interconnecting the center of the pin 287 and the center of the actuating shaft 288. The yielding means between the film engaging shoes and a fixed portion of the projector urges the arm 281 and the link 285 to move beyond the dead center position defined by the axis a—a. The stop member 296 carried by the shaft 288 and movable in the slot 298 of the boss 290 prevents the yielding means from urging the links beyond a substantially predetermined position. Irregularities in film thickness such as caused by the presence of a patch will therefore not force the gate open because the film engaging shoes can move relative to the film tracks carried by the aperture plate housing 241 to compensate for such irregularities.

This is a continuation-in-part of my co-pending application Serial No. 250,310, filed January 11, 1939.

I claim:

1. In a commercial motion picture projector having a film compartment including a fixed member, an aperture plate mounted in the film compartment, a pressure plate having a plurality of spaced substantially vertically extending film engaging shoes slidably mounted on the fixed member and movable between positions adjacent and spaced from the aperture plate, a movable member mounted on the fixed member beneath said film-engaging shoes, a connection between said movable member and the pressure plate comprising motion transmitting means movable beyond a dead center position when the pressure plate is adjacent the aperture plate, yielding means between the film engaging shoes and the fixed member urging the motion-transmitting means beyond said dead center position to prevent unintentional movement of the pressure plate away from the aperture plate, and manually operable means to actuate the motion transmitting means.

2. In a motion picture projector having a film compartment including a fixed wall, an aperture plate mounted in the film compartment, a bracket carried by the wall, a plurality of spaced rods carried by the bracket, a pressure plate carrier arm slidably mounted on a plurality of said rods, a pressure plate housing mounted on the carrier arm, a boss carried by the bracket, a shaft rotatably mounted in the boss and having a stop member movable in a slot of the boss to limit rotational movement of the shaft, a projection on the housing carrier arm, and motion transmitting means between the projection and shaft to move the pressure plate housing between positions adjacent and spaced from the aperture plate.

3. In a motion picture projector having a main casing, a wall dividing the space within the casing into mechanism and film compartments, an aperture plate in the film compartment, a pressure plate housing including film engaging shoes in the film compartment, a carrier arm having a downwardly extending slotted projection supporting the pressure plate housing, connecting means between the carrier arm and wall whereby the arm may move longitudinally in the film compartment, a boss supported by the wall, a shaft rotatably mounted in the boss, an arm carried by the shaft, motion transmitting means between the arm and slot of the downwardly extending projection of the carrier arm whereby the motion transmitting means may move beyond a dead center position in the slot to position the pressure plate housing adjacent the aperture plate and may move in the slot in the opposite direction from the dead center position to move the pressure plate housing away from the aperture plate.

4. In a motion picture projector having a main casing, a film compartment including a fixed wall, an aperture plate in the film compartment, a pressure plate housing in the film compartment, a carrier arm having a downwardly extending projection supporting the pressure plate housing, connecting means between the carrier arm and wall whereby the arm and housing may move longitudinally in the film compartment, a boss supported by the wall, a shaft rotatably mounted in the boss, an arm carried by the shaft, motion transmitting means including a pair of pivotally connected links between the arm and the downwardly extending projection of the carrier arm whereby the motion transmitting means may move beyond a dead center position in one direction to position the pressure plate housing adjacent the aperture plate and may move in the opposite direction from the dead center position to move the pressure plate housing away from the aperture plate.

5. In a motion picture projector having a film compartment defined by at least one fixed member, an aperture plate mounted in the film compartment, a pressure plate housing slidably mounted on a fixed member in the film compartment and having generally vertically extending film-engaging shoes, a housing carrier arm including spaced projections positioned beneath and forwardly of the film-engaging shoes, a movable member carried by a fixed member in the film compartment, a connection between said movable member and the carrier arm comprising a cam carried by the movable member and positioned between the spaced projections of the carrier arm to engage one of said projections and move the pressure plate housing adjacent the aperture plate when the movable member is actuated in one direction and adapted when actuated in the other direction to engage the other of said projections and move the pressure plate away from the aperture plate, stop means associated with the movable member to limit rotational movement of the cam beyond a dead center position with the first-named projection to lock the pressure plate housing adjacent the aperture plate, and manually operable means to actuate the movable member.

6. In a commercial motion picture projector, a film compartment having a stationary wall, an aperture plate positioned in the film compartment, a plurality of spaced rods extending longitudinally in the film compartment, a pressure plate slidably mounted on the rods and having substantially vertically extending film-engaging shoes, motion-transmitting means to move the pressure plate longitudinally on the rods and including relatively movable members positioned beneath and forwardly of said film-engaging shoes and connected to the stationary wall and to the pressure plate and movable in one direction beyond a dead center position to lock the pressure plate adjacent the aperture plate and movable in the opposite direction from the dead center position to separate the pressure plate from the aperture plate whereby film may be introduced between the film-engaging shoes and the aperture plate, stop means to limit movement of the relatively movable members beyond the dead center to define the locked position, yielding means between the film-engaging shoes and the stationary wall urging the relatively removable members toward said locked position, and manually operable means positioned in the film compartment beneath and forwardly of the film-engaging shoes to actuate one of said relatively movable members.

7. In a motion picture projector having a film compartment including a fixed wall, an aperture plate extending transversely relative to the fixed wall, guiding means carried by the fixed wall and extending longitudinally of the film compartment, a pressure plate having a plurality of generally vertically disposed film-engaging shoes, connecting means between the pressure plate and the guiding means whereby the pressure plate may move longitudinally of the film compartment on the guiding means to position the film-engaging shoes in operative or inoperative positions adjacent or spaced from the aperture plate, relatively movable members carried by the pressure plate and said fixed wall respectively and positioned in the film compartment beneath and forwardly of the film-engaging shoes to move the pressure plate longitudinally of the film compartment on the guiding means between said operative and inoperative positions, stop means positioned beneath and forwardly of the film-engaging shoes and operative after the relatively movable members pass beyond a dead center or straight line position to limit movement of said relatively movable members beyond the dead center locked position when the pressure plate is moved to the operative position to place the film-engaging shoes adjacent the aperture plate, yielding means between the film-engaging shoes and the relatively movable members to maintain said relatively movable members in the locked position when the film-engaging shoes are in the operative position adjacent the aperture plate, and manually operable means positioned beneath and forwardly of the film-engaging shoes to actuate one of said relatively movable members to move the pressure plate longitudinally of the guiding means to position the film-engaging shoes in the operative position relative to the aperture plate while film is held in threaded relation relative to the aperture plate.

8. A motion picture projector comprising a film compartment having a wall and an aperture plate, a pressure plate housing having a plurality of spaced generally vertically disposed film-engaging shoes slidably mounted on the wall and movable in the film compartment between positions adjacent and spaced from the aperture plate, a downwardly extended projection carried by the housing, a shaft rotatably journaled relative to the wall, motion-transmitting means between said downwardly extended projection and shaft for controlling the position of the housing with reference to the aperture plate, said motion-transmitting means comprising relatively movable members positioned in the film compartment beneath the film-engaging shoes and operable by rotational movement of said shaft, said members being movable relative to each other beyond a dead center position when the housing is positioned adjacent the aperture plate to lock the housing against unintended separation from the aperture plate, stop means to limit movement of said relatively movable members beyond the dead center position to establish said locked position, yielding means to maintain said relatively movable members beyond the dead center position, and manually operable means positioned beneath the film-engaging shoes to actuate said shaft.

9. In a motion picture projector having a main casing, a film compartment having a fixed wall, a generally vertically disposed aperture plate, a film pressure plate including generally vertically disposed film-engaging shoes, a carrier for the pressure plate having a downwardly extending projection, connecting means between the carrier and the fixed wall whereby the film-engaging shoes may be moved longitudinally relative to the aperture plate in the film compartment between an operative position adjacent the aperture plate and a separated position to permit threading of film into the projector, a support carried by the fixed wall beneath the film-engaging shoes, a shaft rotatably mounted in the support, motion-transmitting means including relatively movable members interposed between the projection of the carrier and the shaft whereby the film-engaging shoes may be locked in the operative position adjacent the aperture plate by movement beyond a dead center position of the relatively movable members by movement of said shaft in one direction and may be moved to the separated position by movement of the shaft in the opposite direction, and manually operable means to move the shaft.

RAYMOND J. MILLER.